B. S. JOHNSON.
FRICTION SHOCK ABSORBING MECHANISM.
APPLICATION FILED MAR. 4, 1918.
1,302,055. Patented Apr. 29, 1919.
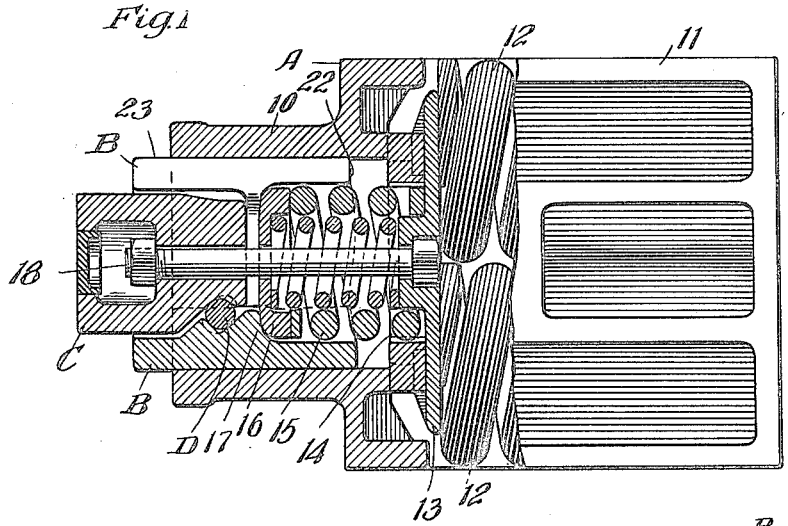
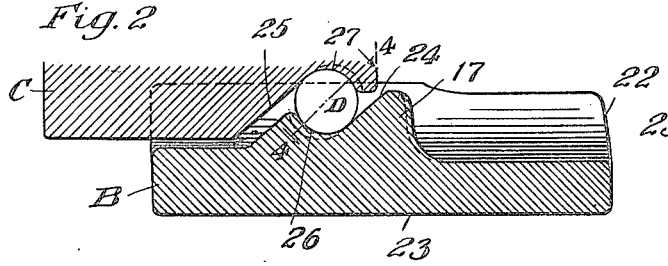
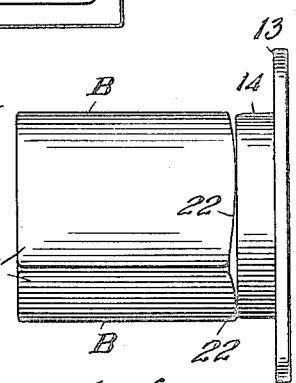
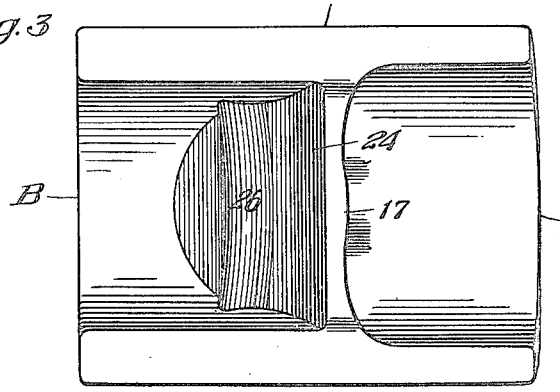
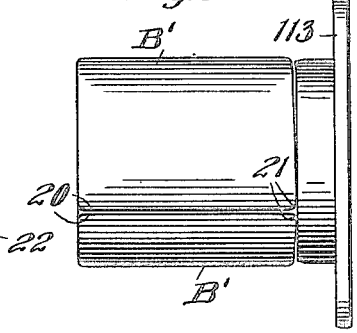
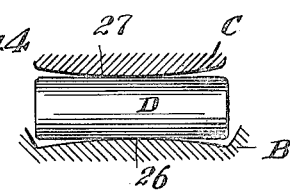
INVENTOR.
Bradley S. Johnson
BY Geo. I. Haight
ATTORNEY

UNITED STATES PATENT OFFICE.

BRADLEY S. JOHNSON, OF CHICAGO, ILLINOIS, ASSIGNOR TO WILLIAM H. MINER, OF CHAZY, NEW YORK.

FRICTION SHOCK-ABSORBING MECHANISM.

1,302,055. Specification of Letters Patent. Patented Apr. 29, 1919.

Application filed March 4, 1918. Serial No. 220,255.

*To all whom it may concern:*

Be it known that I, BRADLEY S. JOHNSON, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

Heretofore, in the operation of certain types of friction shock absorbing mechanisms, and more particularly such mechanisms as employed for friction gears of railway draft riggings, considerable difficulty has been encountered due to scoring or uneven wear of the friction shoes and shell. When such friction gears are manufactured in quantities, it has been found that the majority of the same will wear evenly and uniformly whereas for some reason heretofore unexplainable, a few friction gears apparently of identical structure and form will wear excessively at a few points. By extended experiments and observations of a number of said friction gears operating under conditions similar to actual service, I have discovered the sources of the difficulties above indicated. Generally stated, the difficulties arise from the concentration of pressure from the wedge to the friction shoes of the gear on certain parts of the shoes due to slight inequalities in the manufacture of the various parts, which it is impracticable to eliminate in commercial manufacture. As is well known, friction gears for railway service are either cast or drop forged and machining is impracticable on account of the excessive cost which would be entailed thereby and although a high degree of perfection has been obtained in the manufacture of the friction gears with the methods commercially available, it is substantially impossible to obtain absolute uniformity of all the parts.

In the drawing I have illustrated a well known type of friction gear for railway draft riggings wherein is employed a cylindrical friction shell, three friction shoes circularly arranged, a central wedge, anti-friction rolls between the wedge and shoes, two heavy main springs, a follower for the main springs, and a preliminary spring interposed between said followers and the shoes. From observation, I have determined that the excessive wear above referred to, may be occasioned by any one or any combination of three main factors. For instance, it is well known that the main springs of railway draft gears while theoretically of equal capacity for a particular type, vary considerably from the standard capacity so that, in the type of gear illustrated in the drawing, it is obvious that if one of the main springs should be of somewhat greater capacity than standard and the other spring of corresponding less capacity than standard, the spring follower would be resisted unequally with a tendency for the follower to tilt when the gear is actuated. This would result in an unbalanced resistance to the friction shoes when the latter engage the follower with consequent concentration of pressure on one of the friction shoes. Also, due to the methods of manufacture necessarily employed, it is possible for one side of a friction shoe to be slightly longer than the other side so that the friction shoe will engage the spring follower at one corner and thereby concentrate the pressure on that corner or side of the friction shoe with resulting scoring of the friction shell and excessive wear of the shoe itself. Another condition which may arise results from an application of pressure to the wedge at an angle to the axis of the draft gear. This causes the wedge to tilt from its normal position thereby changing the relation of the three sets of coöperating wedge faces of the wedge and friction shoes which in turn will concentrate the pressure on one or two of the shoes and at one side of the shoes.

The object of my invention is to provide means which will absolutely overcome the possibility of any of the above indicated difficulties taking place and which means may be embodied in the parts now employed in friction gears or shock absorbing mechanisms without any appreciable additional expense.

In the drawing forming a part of this specification, Figure 1 is a part longitudinal, sectional view, part side elevation of a friction gear suitable for railway draft riggings and showing my improvements in connection therewith. Fig. 2 is an enlarged, detail, sectional view illustrating more particularly the relation of one wedge face and coöperating friction shoe with the anti-friction roller interposed therebetween and showing also one portion of my invention in connection therewith. Fig. 3 is a plan view of one of the improved friction shoes embodying my invention. Fig. 4 is a detail, sectional view, taken substantially on the line 4—4 of Fig. 2. Fig. 5 is an elevational view illustrating the manner in which the friction shoes embodying my improvements coöperate with the main spring follower to overcome the difficulties heretofore experienced. And Fig. 6 is a view similar to Fig. 5 illustrating upon a somewhat exaggerated scale the manner in which one of the difficulties heretofore experienced may occur.

In said drawing, A denotes a combined cast friction shell and spring cage having a cylindrical friction shell 10 proper and an integral substantially rectangular spring cage 11, the spring cage 11 being so designed as to accommodate a pair of heavy main springs 12—12. The springs 12—12 at their outer ends engage a main spring follower 13 having a forwardly extended annular flange 14 which provides a seat for the inner end of a preliminary spring 15. The spring 15 at its outer end engages a preliminary spring follower 16 that bears against inwardly extending flanges 17—17 of three circularly arranged friction shoes B—B. Within the friction shoes B is extended a wedge C having wedge faces, as hereinafter described, coöperable with the wedge faces of the friction shoes, there being interposed a series of anti-friction rolls D between the shoes and the wedge. A retaining bolt 18 extends through the wedge C, through the follower 16, spring 15 and main spring follower 13, said bolt holding the parts in assembled relation and the spring 15 under tension, as will be apparent from an inspection of the drawing. All of the foregoing parts, so far as they are described broadly, are well known and the operation of the friction gear will be apparent to those skilled in the art.

As shown in Fig. 6 of the drawing, the friction shoes B'—B' thereof are elongated on one edge, as indicated at 20—20, one shoe B' being elongated on one edge, and the other shoe B' on the adjacent edge. The result is, as will be apparent from an inspection of said figure, that the pressure on the two shoes shown in said figure is concentrated at the two adjacent corners, as indicated at 21—21, where the shoes B' engage with the main spring follower 113. This would result in excessive wear on the adjacent edges of the shoes B'—B' and also in scoring of the friction shell at the portions opposite to said edges. It is also evident that a substantially similar condition would arise should the friction shoes B' be made of absolutely equal length on each edge but the spring follower 113 tilted somewhat when the spring resistance in back of the same is uneven.

In order to avoid the two conditions just above described in connection with Fig. 6, I construct each of my improved friction shoes B as follows: As will be apparent from inspection of the drawing, each of the shoes B is of circular form as viewed at its ends or, more strictly speaking, each shoe in transverse section constitutes that portion of an annulus corresponding to an angle of somewhat less than 120°. This provides the outer cylindrical friction surface 23 to coöperate with the corresponding interior cylindrical surface of the shell. Each shoe is, of course, provided on its interior with a wedging surface as hereinafter explained. At the inner end of each shoe formed as above described, the same is made convex as viewed from the interior of the shoe and as clearly disclosed in Fig. 3. This convex surface 22 is, of course, of arcuate formation when viewed from the inner end of the shoe. The convex edge 22 above mentioned insures a substantially line contact between the shoe and the flange 14 of the follower 13 at the periphery of the shoe. This line contact is also substantially always at the center of the friction shoe at its inner end.

Thus, with the curved inner edges of the shoes 22 above described, it is apparent that even should the main spring follower 13 tilt somewhat from its correct position, nevertheless the points of contact between the shoes and said follower would remain at or very close to the centers of the friction shoes at their peripheries and it is impossible to concentrate the pressure on the shoes B near the corners or edges thereof. This results in maintaining the friction shoes with their outer cylindrical friction surfaces 23 in perfect contact with the interior cylindrical friction surfaces of the shell and promotes uniform wearing of the engaging friction surfaces. It will be evident to those skilled in the art that the changes involved, while of great practical importance, can be accomplished without any additional expense in the initial manufacturing cost.

In order to compensate for changes in the position of the wedge relatively to the shoes, due to an eccentric application of pressure to the wedge, I employ the following arrangement: Each friction shoe B, as is now customary, is provided with an inwardly inclined plain wedge surface 24 and the wedge C is provided with three corresponding parallel coöperating wedge surfaces 25, Between each set of parallel wedge surfaces 24 and 25 is interposed an anti-friction roll D as heretofore described. Heretofore, it has been the practice to provide the friction shoes and the wedge with parallel roll seats to hold the anti-friction rolls in place, said parallel roll seats of course preventing the anti-friction rolls from oscillating to conform with any change in position of the wedge relatively to the shoes. This has resulted in the pressure from the wedge being concentrated at the end of one or more of the friction rolls and consequent concentration of the pressure to the sides of corresponding friction shoe or shoes. As it is evident that the wedge may assume any one of an infinite number of positions relatively to the shoes (within the limits of the clearance between the wedge and the shoes), means should be provided to permit the anti-friction rolls to accommodate themselves to the different conditions which may arise. This I accomplish by making each pair of roll seats 26 and 27 on the friction shoes and wedge with opposed convex surfaces, as best illustrated in Fig. 4. That is to say, while the roll seats 26 and 27 are made concave as viewed in Fig. 2, to fit the adjacent rolls, they are convexed longitudinally, as viewed in Fig. 4, to permit the anti-friction rolls to oscillate about axes which are perpendicular to the corresponding pairs of parallel coöperating wedge surfaces 24 and 25. Consequently, when the wedge C is tilted or oscillated from its normal position, the anti-friction rolls can adjust themselves thereto while at the same time maintaining a true and perfect line contact with the opposed pairs of parallel wedge surfaces 24 and 25 between which the rolls are mounted. This insures an equal application of pressure from the wedge to all the anti-friction rolls throughout the entire lengths of the latter and thereby uniform pressure from the rolls to the shoes. It will also be apparent to those skilled in the art that the change involved in the roll seats above described can be made without any appreciable extra cost over the shoes as now manufactured.

Although I have herein shown and described what I now consider the preferred manner of carrying out my invention, the same is merely illustrative and I contemplate all changes and modifications that come within the scope of the claims appended hereto.

I claim:

1. In a friction shock absorbing mechanism having a friction shell, friction shoes, a wedge, main spring resistance, and a follower between said resistance and the shoes; means for always insuring transmission of pressure from approximately the center of each shoe at its periphery to said follower in substantially a single line parallel to the axis of the shell, and adjacent the friction surface of the latter.

2. As an article of manufacture, a friction shoe for a friction shock absorbing mechanism, said shoe having an outer friction surface curved in transverse section, an inner wedging surface, and an inner end edge also curved in transverse section and adapted to engage another member of the mechanism, said inner end edge, at its central portion adjacent the friction surface, extending beyond the portions of said end edge at either side of the center to thereby insure contact between said shoe and said member at the center of the inner edge of the shoe at a point adjacent the friction surface of the shoe.

3. As an article of manufacture, a friction shoe for a friction shock absorbing mechanism, said shoe, in transverse section, constituting a part of an annulus and having the exterior surface of the shoe forming a friction surface, said shoe having also an inner wedging surface, the inner end edge of said shoe being convex, the convex edge being adapted to engage another member of the mechanism to insure a point of contact between the shoe and said member centrally of the shoe adjacent its periphery.

4. In a shock absorbing mechanism, the combination with a friction shell having an interior cylindrical friction surface, main spring resistance, a follower, and a wedge, of friction shoes coöperable with said wedge and shell, said shoes having exterior cylindrical friction surfaces, the inner end edges of said shoes being adapted to engage said follower when the mechanism is actuated, said inner end edges of said shoes having the central portions thereof at the peripheries of the shoes extended beyond the portions on each side of the center of the inner edges substantially as and for the purpose specified.

5. In a friction shock absorbing mechanism, the combination with a friction shell, of friction shoes coöperable therewith, a wedge, a main spring resistance, and anti-friction rolls between the wedge and shoes, said wedge and shoes having parallel coöperating sets of wedging surfaces with which said rolls are adapted to engage, said shoes and wedge having roll seats to hold the latter in proper position; and means on said shoes and wedge to permit oscillation of the rolls about axes perpendicular to the corresponding coöperating sets of wedge surfaces.

6. In a friction shock absorbing mechanism, the combination with a cylindrical friction shell, of three friction shoes coöperable with said shell, a wedge, said wedge and shoes having three sets of coöperating parallel wedging surfaces, an anti-friction roll interposed between each shoe and the wedge, coöperating means on said wedge and shoes to permit the rolls to oscillate about axes perpendicular to the corresponding sets of coöperating wedging surfaces when the wedge is tilted with respect to the shoes; and a main spring resistance.

7. As an article of manufacture, a friction shoe for a friction shock absorbing mechanism, said shoe having an outer friction surface, an inner wedging surface, and a roll seat at one end of said wedging surface, said roll seat being convex in longitudinal section.

8. As an article of manufacture, a wedge for friction shock absorbing mechanisms, said wedge having a plurality of wedging surfaces and a roll seat adjacent each wedging surface, each of said roll seats having a convex surface in longitudinal section.

9. As an article of manufacture, a friction shoe for friction shock absorbing mechanisms, said shoe having an outer curved friction surface, an inner wedging surface, a roller seat at one end of said wedging surface, the roller seat being convex in longitudinal section, the inner end of said shoe being convex and adapted to engage another member of the shock absorbing mechanism.

In witness that I claim the foregoing I have hereunto subscribed my name this 14th day of Feb., 1918.

BRADLEY S. JOHNSON.